United States Patent [19]

Sato et al.

[11] Patent Number: 5,207,138
[45] Date of Patent: May 4, 1993

[54] SHEAR

[75] Inventors: Hisashi Sato, Yokohama; Shigeki Narishima, Yokosuka; Satoru Kumabe, Yokohama, all of Japan

[73] Assignee: Ishikawajima-Harima Jukogyo Kabushiki Kaisha, Tokyo, Japan

[21] Appl. No.: 754,066

[22] Filed: Sep. 3, 1991

[30] Foreign Application Priority Data

Sep. 4, 1990 [JP] Japan .................. 2-234046
Nov. 30, 1990 [JP] Japan .................. 2-127979
Dec. 20, 1990 [JP] Japan .................. 2-412402

[51] Int. Cl.$^5$ ............................. B26D 1/62
[52] U.S. Cl. ....................... 83/337; 83/305; 83/344
[58] Field of Search ............... 83/308, 337, 344, 322, 83/286, 304, 175, 176, 543, 72

[56] References Cited

U.S. PATENT DOCUMENTS

| | | | |
|---|---|---|---|
| 1,948,139 | 2/1934 | Smitmans | 83/305 |
| 3,110,209 | 11/1963 | Takehara | 83/322 |
| 3,570,348 | 3/1971 | Hallden | 83/305 X |
| 4,058,041 | 11/1977 | Ito | 83/305 |
| 4,112,798 | 9/1978 | Yoshizawa et al. | 83/344 |
| 4,656,905 | 9/1987 | Ginzberg et al. | 83/305 X |
| 4,732,028 | 3/1988 | Bodnar | 83/337 X |

FOREIGN PATENT DOCUMENTS 5114709 2/1976 Japan .
5114710 2/1976 Japan .

*Primary Examiner*—Frank T. Yost
*Assistant Examiner*—Kinaldi Rada
*Attorney, Agent, or Firm*—Oblon, Spivak, McClelland, Maier & Neustadt

[57] ABSTRACT

Upper and lower drums each with a blade are separated from each other by a hydraulic cylinder until a rotating velocity of the drums are accelerated to a predetermined level. Then, the drums are relatively approached by the cylinder so that gears each fitted to a shaft of the corresponding drum are engaged with each other to keep constant a gap between the blades. The blades are approached to a feed line of a strip to cut off the strip.

2 Claims, 15 Drawing Sheets

SHEAR

BACKGROUND OF THE INVENTION

The present invention relates to a shear.

Known are shears for transversely cutting a steel or the like strip moving horizontally and longitudinally.

For example, Japanese Patent 2nd Publication No. 61-53172 discloses a drum shear comprising upper and lower drums rotatably extending transversely of a strip. Each of the drums has a blade fixed thereto and extending transversely of the strip. The drums are mechanically interlinked through a transmission such as gearing so as to be synchronously driven.

Japanese Patent 1st Publication No. 52-132485 discloses a drum flying shear comprising upper and lower drums rotatably extending transversely of a strip. Each of the drums has a blade fixed thereto and extending transversely of the strip. Either or both of the drums are vertically movable for retraction of the corresponding blade or blades away from the strip feed line.

FIG. 1 shows a conventional shear in which, in a shearing operation, drums a and b are energized such that the strip e is moved at a running velocity V at a center X of a lap between the blades c and d.

FIG. 2 represents another conventional shear which comprises a housing f having vertically movable upper and lower drum chocks i and j therein for rotatably supporting upper and lower drums g and h. The upper drum chock i is vertically movably connected through an eccentric wheel 1 and a connecting rod m to a rotary shaft k rotatably supported by the housing f whereas the lower drum chock j is vertically movably supported through a vertically extending cylinder n to the housing f. Reference numeral o represents a balance cylinder between the drum chocks i and j.

In a shearing operation, the upper and lower drums g and h which have been stopped are synchronously rotated. At the same time, the rotary shaft k is rotated to vertically move the upper drum chock i through the wheel 1 and the rod m. When the rotating velocity of the drums g and h becomes equal to the strip feed velocity and the upper drum chock i is lowered, the cylinder n is extended and the lower drum chock j is moved up so that the strip is cut off between the drums g and h.

According to the drum shear in the Japanese Patent 2nd Publication No. 61-53172, the upper and lower blades cut off the strip before the drums are rotated by one turn. Therefore, the drums cannot be accelerated from the stopping state to full extent, failing to move the strip at high velocity.

In the drum shear of the Japanese Patent 1st Publication No. 52-132485, the upper and lower drums are not mechanically interconnected through a transmission so that it is difficult in a shearing operation by rotating the upper and lower drums to maintain constant a gap between the upper and lower blades, failing to neatly cut the strip.

In the conventional shear as shown in FIG. 1 with the strip e running at a running velocity V, a velocity V' of the blades c and d in contact with the strip e as shown in one-dot chain line in FIG. 1. is:

$$V' = V \cos \theta$$

and is slower than the running velocity of the strip e. As the result, scratches may be produced on surfaces of the strip e by edges of the blades c and d due to such velocity difference. This is undesirable in terms of production yield.

With the conventional shear shown in FIG. 2, the upper and the lower drums g and h are vertically moved by separate drive means. That is, two series of drive systems are required. It is very difficult to synchronize the vertical movements of the drums g and h by the two drive systems.

BRIEF SUMMARY OF THE INVENTION

In a shear having upper and lower drums extending transversely of a strip and above and below a feed line of a strip moving horizontally and longitudinally, shafts on opposite ends of each of the drums and supported by chocks, and blades fixed to the corresponding drums and extending transversely of a strip, a shear according to claim 1 of the present invention comprises at least one of said chocks being vertically movably supported, hydraulic cylinder means for vertically moving said vertically movably supported chock, gears fixed to said shafts of the upper and lower drums so as to be engaged upon relative approach of the drums, a synchronous drive connected through a transmission to said shafts of the upper and lower drums, said transmission having a sensor to output a detection signal by detecting a rotating velocity of at least one of the upper and lower drums, pipeline means with a servo control valve for exerting hydraulic pressure to said hydraulic cylinder means and a controller for outputting a control or changeover signal to said servo control valve according to the detection signal from said sensor.

In the shear according to claim 1 of the present invention, when the strip is to be cut off, the upper end and the lower drums are rotated by a drive.

When the rotating velocity of the upper and lower drums detected by the sensor reaches a predetermined value and drum blades are located downstream in a direction of feed of the strip, the controller issues a control or changeover signal to control the servo control valve. As a result, the vertically movably supported chock or chocks are moved toward the strip feed line by the hydraulic cylinder means and the gears on the shafts of the drums engage with each other. As the upper and lower drums are rotated, the blades cut off the strip while maintaining a gap between confronting vertical faces of the blades.

Upon cutting of the strip, the upper and lower drums are at a rotating velocity higher than the predetermined value so that the control signal is not issued any more from the controller to the servo control valve. The vertically movably supported chock or chocks are retracted away from the strip feed line by the hydraulic cylinder means and the gears on the shafts of the upper and lower drums are released from engagement.

In a shear according to claim 2 of the present invention, upper and lower drums are rotatably mounted on the housing with one of them being vertically movable. A blade for cutting a strip is mounted on the vertically movable drum with a blade edge being aligned with an outer periphery of the drum and on a plane including an axis of the drum. A blade for cutting the strip is mounted on the other vertically immovable drum with a blade edge protruding from an outer periphery of the drum and on a plane including an axis of the drum.

In the shear according to claim 2 of the invention, the drum with the blade edge in alignment with the drum outer periphery is vertically moved toward the other drum whose blade edge protrudes from the drum outer periphery so that the strip is cut off while it is wrapped around the moving drum.

In a shear according to claim 3 of the invention, upper and lower drum chocks for rotatably supporting upper and lower drums are vertically movably mounted inside a housing. Column means extend upward from the lower drum chock and movably penetrate the upper drum chock. A lift plate is fixed to the column means adjacent to a top of the column means so that the plate is movable in the housing together with the lower drum. Vertically extendable lift drive is disposed between the upper drum chock and the lifting plate. The housing is provided with a first stop for stopping the upper drum chock at a strip cutting position and a second stop for defining a lower limit position of the lower drum chock.

With the shear according to claim 3, the lift drive is extended to lower the upper drum chock relative to the lift plate integral with the lower drum chock, which is restrained by the second stop from being lowered, until the upper drum chock is stopped by the first stop. Then, the lower drum chock is moved up together with the lift plate relative to the upper drum chock. As the result, the strip is cut off by blades of the upper and lower drums supported by the upper and lower drum chocks.

DETAILED DESCRIPTION OF THE PREFERRED EMBODIMENTS

Figure 1:
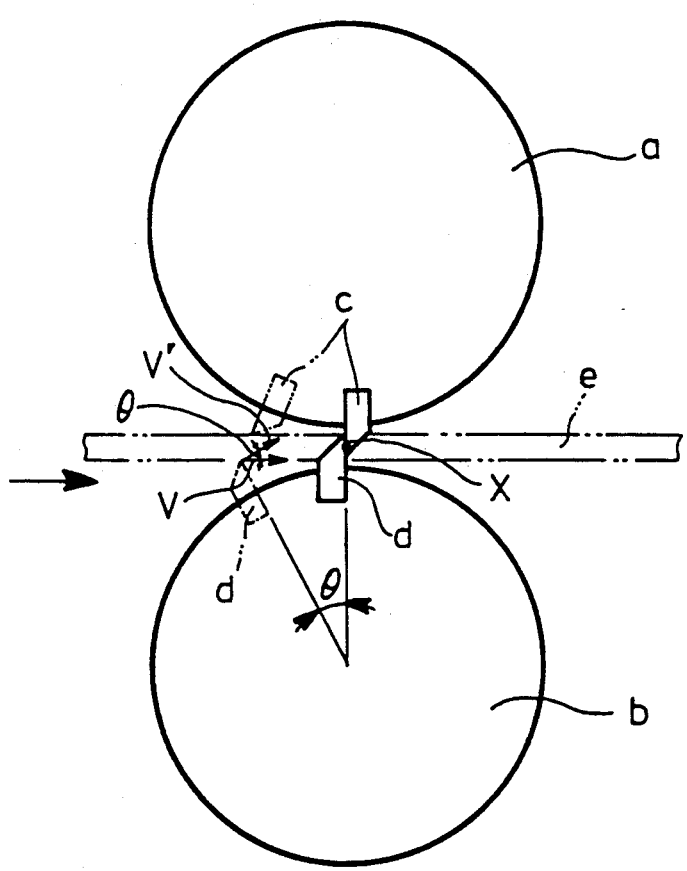
FIG. 1 is a side view showing a conventional shear.
Figure 2:
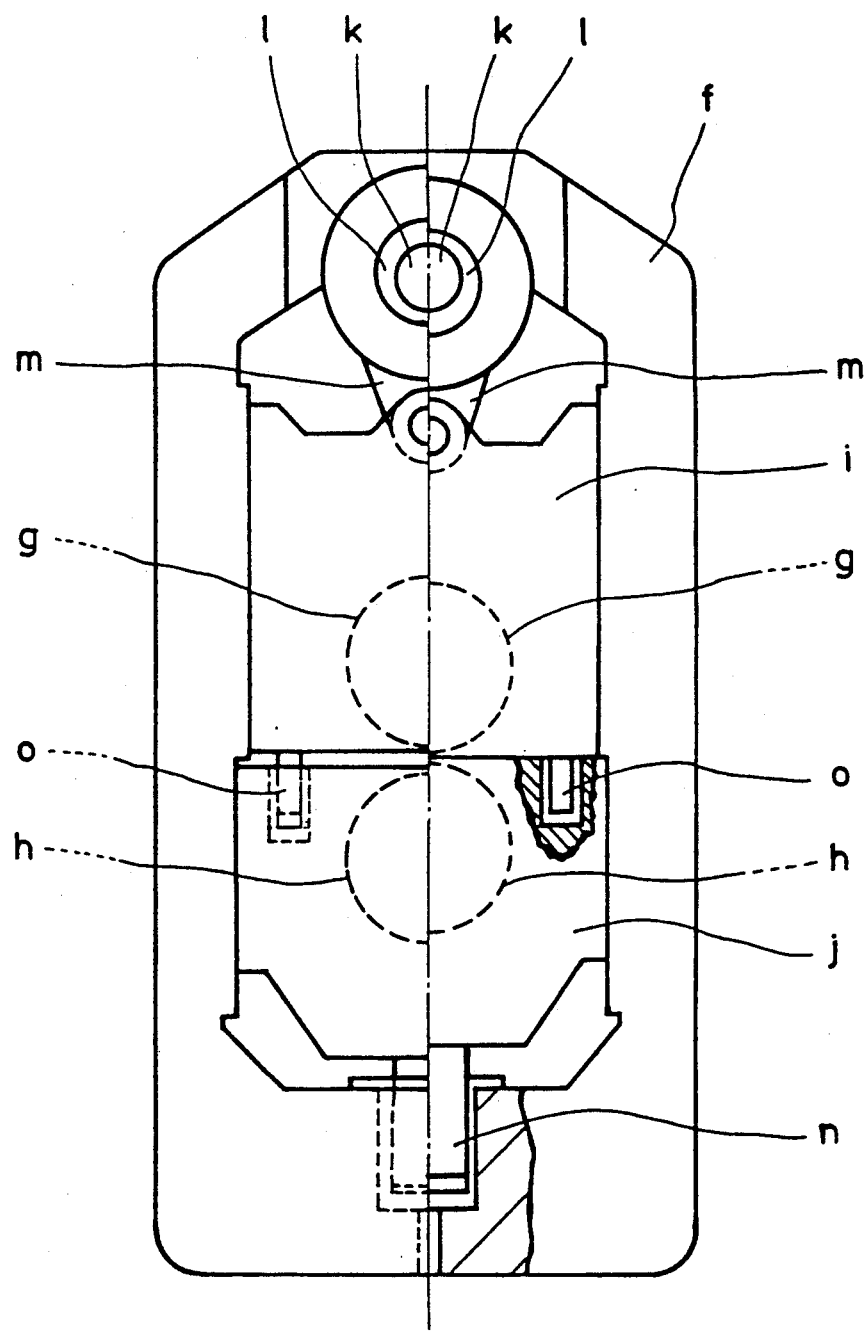
FIG. 2 is a side view showing another conventional shear.

FIGS. 3 to 8 show a first embodiment of the present invention. A lower drum 2 is disposed below a feed line S of a strip moving horizontally and longitudinally and extends horizontally and transversely of the strip 1. The drum 2 has at its opposite ends shafts 3a and 3b which are supported through bearings 4a and 4b by lower drum chocks 5a and 5b, respectively. An upper drum 6 disposed above the strip feed line S has the same shape as that of the drum 2 and extends horizontally and transversely of the strip 1. The drum 6 has at its opposite ends shafts 7a and 7b which are supported through bearings 8a and 8b by upper drum chocks 9a and 9b. Blades 45 and 46 extends transversely of the strip 1 and are fixed to the drums 6 and 2, respectively.

Below the lower chocks 5a and 5b, lower hydraulic cylinders 11a and 11b having upwardly extendable piston rods 10a and 10b are disposed such that upper ends of the rods 10a and 10b may contact lower surfaces of the chocks 5a and 5b. Above the upper chocks 9a and 9b, upper hydraulic cylinders 13a and 13b having downwardly extendable piston rods 12a and 12b are disposed with their piston rods 12a and 12b being fixed to the upper chocks 9a and 9b.

The chocks 5a, 5b, 9a and 9b are vertically movably fitted to a housing (not shown). The hydraulic cylinders 11a, 11b, 13a and 13b are fixed to the housing.

Lower gears 14a and 14b are coaxially fixed to the opposite shafts 3a and 3b of the lower drum 2, respectively. Upper gears 15a and 15b having the same shape as that of the lower gears 14a and 14b are coaxially fixed to the opposite shafts 7a and 7b of the upper drum 6 so that they may be engaged with the lower gears 14a and 14b, respectively.

Furthermore, lower rings 16a and 16b are coaxially fixed to the opposite shafts 3a and 3b of the lower drum 2. Upper rings 17a and 17b having the same shape as that of the lower rings 16a and 16b are coaxially fixed to the opposite shafts 7a and 7b of the upper drum 6 so that they may contact the lower rings 16a and 16b, respectively.

Contact of the lower rings 16a and 16b with the upper rings 17a and 17b are attained upon relative approach of the lower chocks 5a and 5b and the upper chocks 9a and 9b.

Upper and lower transmission shafts 18 and 19, which extend horizontally and transversely of the strip 1, have pinions 20 and 21 fixed thereto, respectively, and are supported such that the pinions 20 and 21 are engaged with each other. Thus, a gear box 22 is provided at one side of the drums 6 and 2. Couplings 47 and 48 fitted over the shafts 7b and 3b are connected through universal joints 23 and 24 to corresponding ends of the intermediate shafts 25 and 26 the other ends of which are in turn connected through universal joints 27 and 28 to corresponding ends of the transmission shafts 18 and 19, respectively.

The other end of the shaft 18 is connected through a joint 29 to an output shaft 31 of a motor 30 while the other end of the shaft 19 is connected through a joint 32 to a detection shaft 34 of a rotational position sensor 33.

A hydraulic pump 35 has an opening for discharge of oil pumped from a hydraulic oil tank 41. The discharge opening of the pump 35 is connected through a pipeline or hydraulic device 36 to a servo control valve 37. The servo control valve 37 is further connected through a pipeline or hydraulic device 38 to head-side fluid chambers of the cylinders 11a, 11b, 13a and 13b, through a pipeline or hydraulic device 39 to rod-side fluid chambers of the cylinders 11a, 11b, 13a and 13b and further through a pipeline or hydraulic device 40 to the tank 41.

The rotational position sensor 33 detects rotational position of the transmission shaft 19 to issue a detection signal 42 to a controller 43 where a control or change-over signal 44 depending upon the detection signal 42 is outputted to the servo control valve 37.

The servo control valve 37 normally connects the pipelines 36 and 40 with the pipelines 39 and 38, respectively. Upon receipt of a control signal 44, the valve 37 then connects the pipelines 36 and 40 with the pipelines 38 and 39, respectively.

Figure 3:
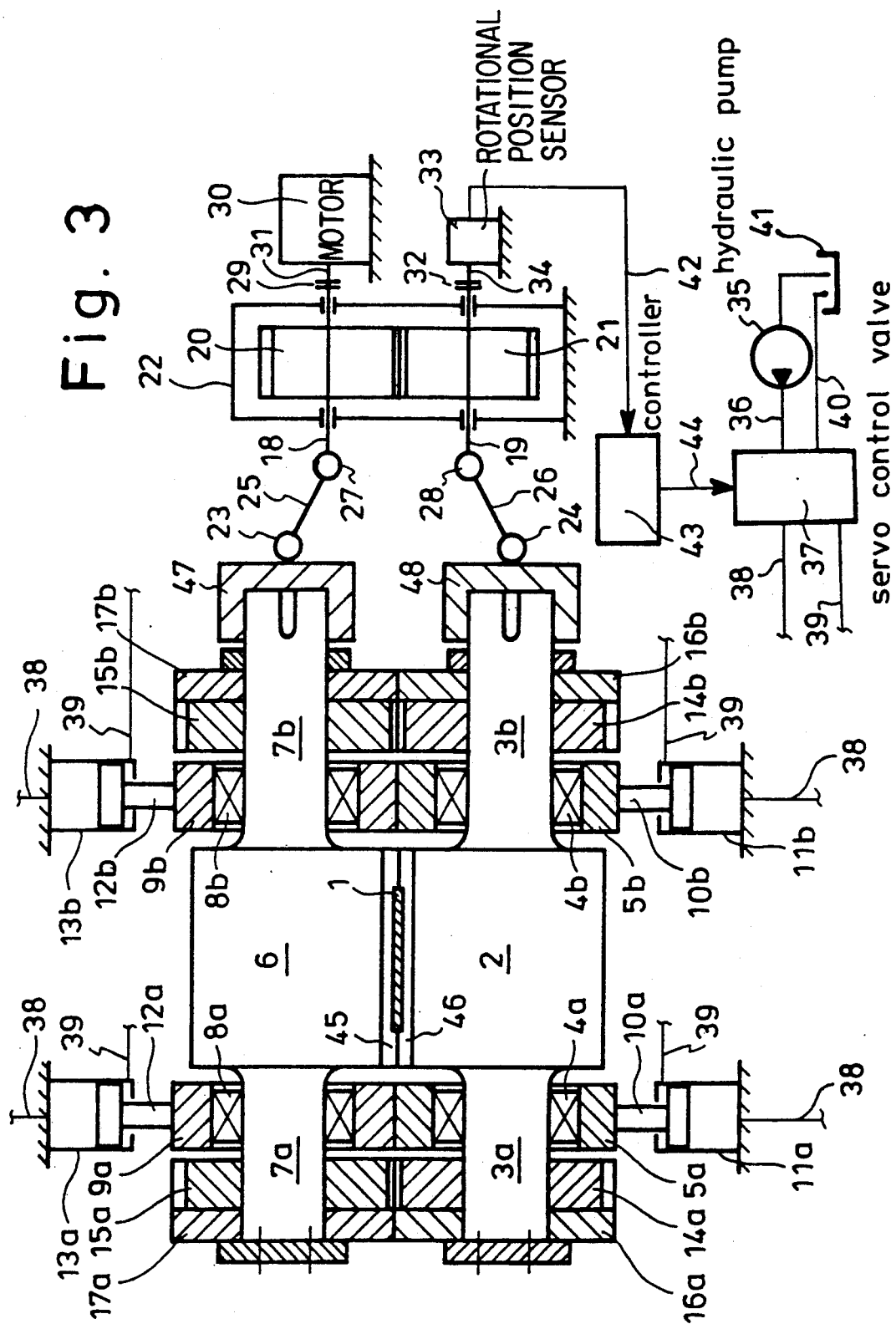
FIG. 3 is a view partially in cross section showing a first embodiment of a shear according to the present invention.
Figure 4:
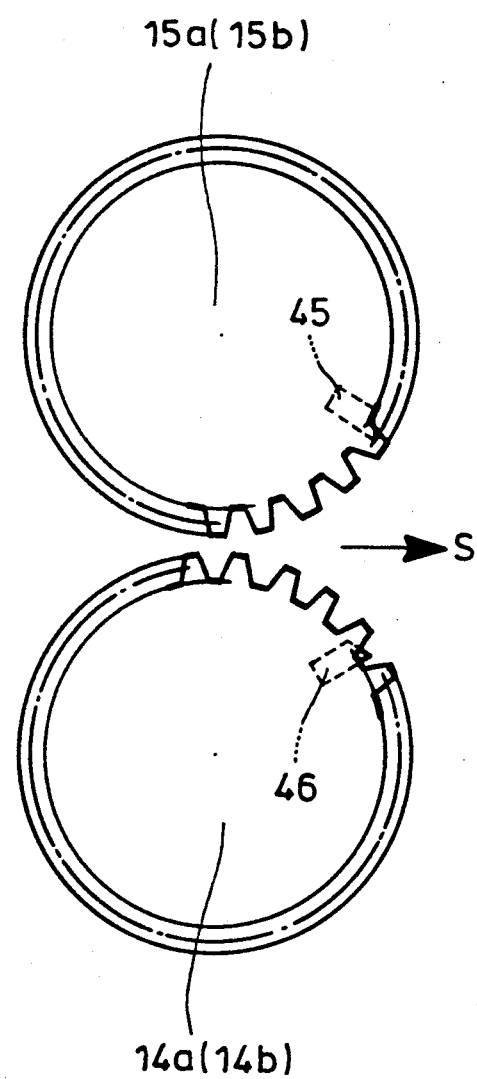
FIGS. 4 to 8 are side views showing movements of gears fixed to upper and lower roll shafts and of blades fixed to upper and lower rolls of the shear of FIG. 3.
Figure 5:
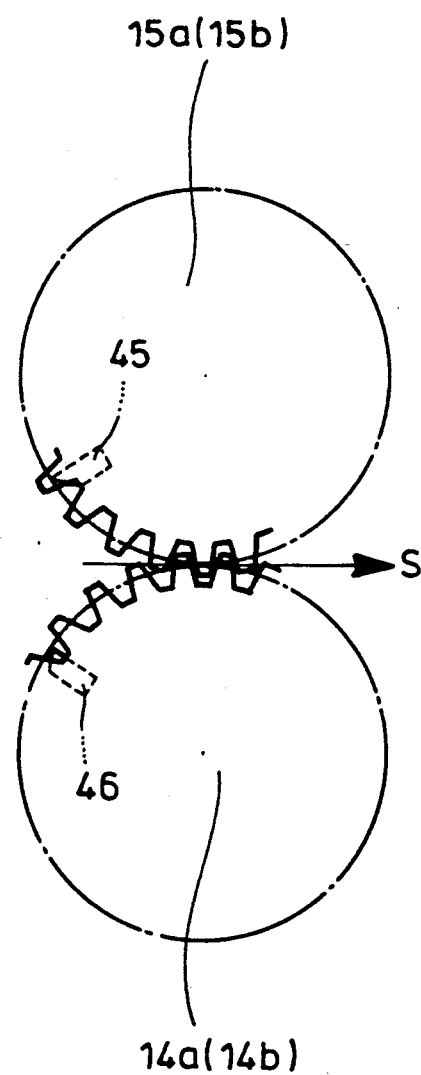
Figure 6:
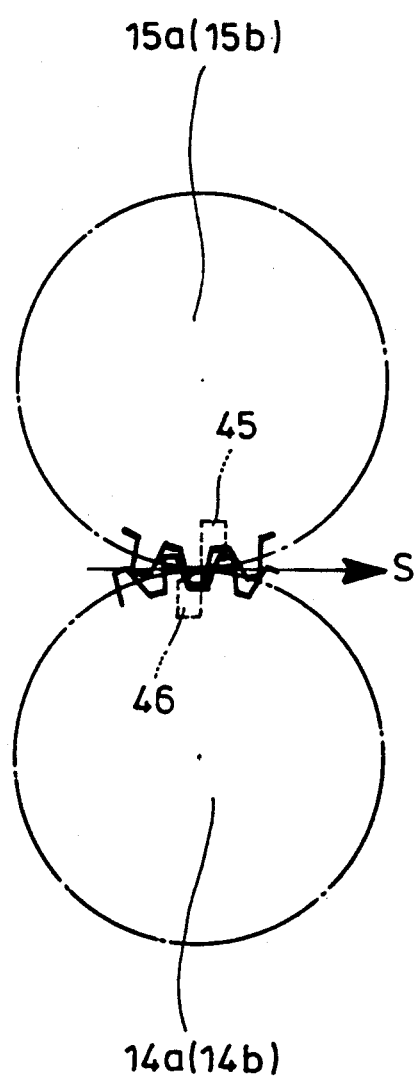
Figure 7:
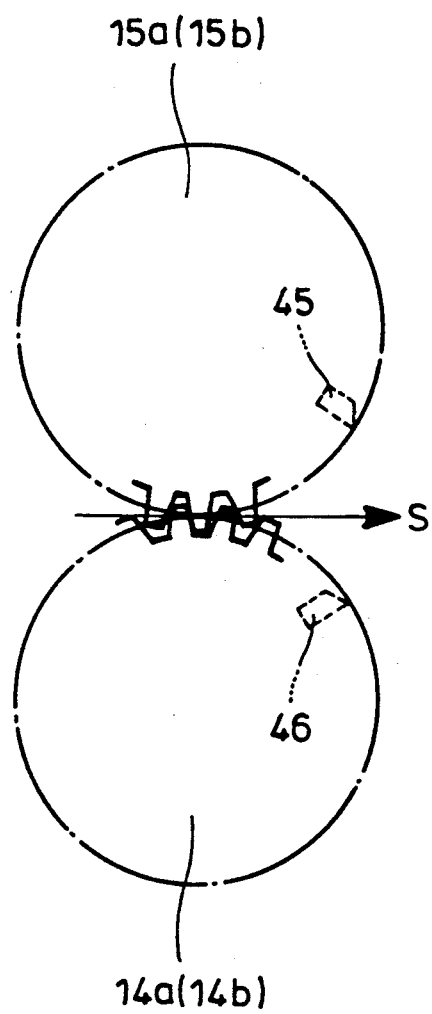
Figure 8:
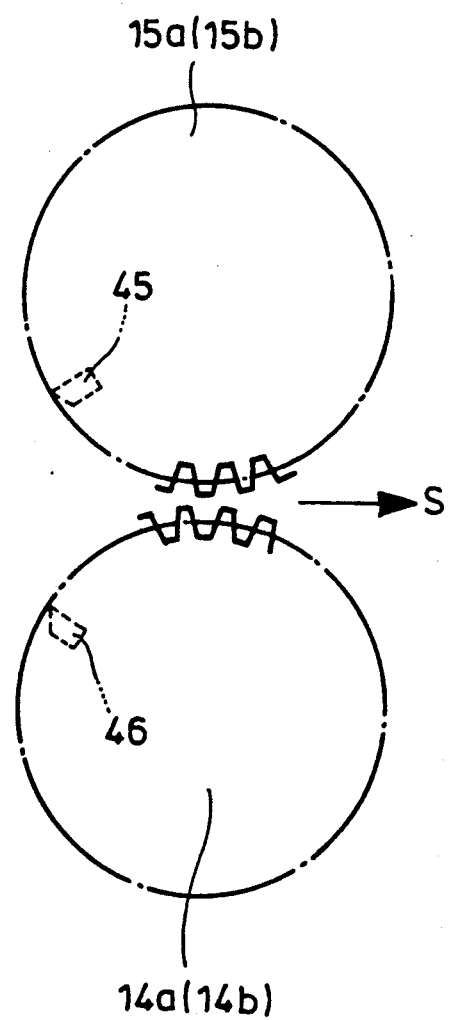

The controller 43 is designed such that the control signal 44 is issued in accordance with the detection signal 42 (See. FIG. 3) when the transmission shaft 19 is rotated at a predetermined velocity and the blades 45 and 46 of the drums 6 and 2 are downstream in the direction of feed of the strip 1.

Mode of operation of the shear according to this embodiment of the present invention will be described.

When the strip 1 longitudinally moving between the drums 6 and 2 is to be cut off, the motor 30 is energized to transmit its rotating force to the shaft 7b through the output shaft 31, the joint 29, the support shaft 18, the universal joint 27, the intermediate shaft 25 and the universal joint 23 so that the upper drum 6 is rotated. The rotating force from the motor 30 to the support shaft 18 is transmitted to the shaft 3b through the pinions 20 and 21, the support shaft 19, the universal joint 28, the intermediate shaft 26, the universal joint 24 so that the lower drum 2 is rotated.

In this case, the control signal 44 is not outputted from the controller 43 to the control valve 37. The hydraulic oil from the pump 35 applies pressure to the rod-side fluid chambers of the cylinders 11a, 11b, 13a and 13b through the pipeline 36, the servo control valve 37 and the pipeline 39. The piston rods 10a, 10b, 12a and 12b are held at the retracted positions; the upper chocks 9a and 9b are separated from the lower chocks 5a and 5b and the upper gears 15a and 15b are out of engagement with the lower gears 14a and 14b; and, the blades 45 and 46 are at retracted positions above and below the strip feed line S (See FIG. 4).

When the support shaft 19 is accelerated to be rotated at a predetermined velocity by the motor 30 and a predetermined peripheral velocity of the drums 6 and 2 is reached, the rotation position sensor 33 issues the detection signal 42 to the controller 43 where the control signal 44 is issued to the servo control valve 37.

The valve 37 is set to a position by the control signal 44 such that the pipelines 36 and 40 are respectively communicated with the pipelines 38 and 39. The hydraulic oil from the pump 35 applies pressure to the head-side fluid chambers of the cylinders 11a, 11b, 13a and 13b through the pipeline 36, the servo control valve 37 and the pipeline 38. As a result, the piston rods 10a, 10b, 12a and 12b are protruded into mutual approach of the upper chocks 9a and 9b and the lower chocks 5a and 5b. Before the blades 45 and 46 cut off the strip 1, the upper gears 15a and 15b engage with the lower gears 14a and 14b, respectively (See FIG. 5). The drums 6 and 2 are further rotated and the blades 45 and 46 cut off the strip 1 while keeping a certain gap (See FIG. 6). As the drums 6 and 2 are further rotated, the blades 45 and 46 are separated away from the strip feed line S (See FIG. 7).

In this case, the upper rings 17a and 17b are caused to contact the lower rings 16a and 16b, respectively, while the upper gears 15a and 15b are properly engaged with the lower gears 14a and 14b, respectively.

When the strip 1 is cut off by the blades 45 and 46, the support shaft 19 has been rotated at a velocity more than the predetermined level. Therefore, the control signal 44 is no more issued from the controller 43 to the control valve 37 and the valve 37 is set to a position such that the pipelines 36 and 40 are respectively communicated with the pipelines 40 and 39. The hydraulic oil from the pump 35 applies pressure to the rod-side fluid chambers of the cylinders 11a, 11b, 13a and 13b through the pipeline 36, the servo control valve 37 and the pipeline 39. As a result, the piston rods 10a, 10b, 9a and 9b are retracted and the upper chocks 9a and 9b are separated from the lower chocks 5a and 5b. Furthermore, the upper gears 15a and 15b are released from engagement with the lower gears 14a and 14b, respectively, and the drums 6 and 2 are retracted into inoperative positions above and below the feed line S of the strip 1 (See FIG. 8).

As described above, according to a shear of this embodiment, the upper and lower drums 6 and 2 are rotated with the blades 45 and 46 being retracted away above and below the feed line S of the strip 1. Therefore, a peripheral velocity of the drums 6 and 2 can be sufficiently accelerated to increase the running velocity of the blades 45 and 46, whereby the strip 1 moving at high velocity can be cut. The strip 1 can be cut off correctly and neatly by the blades 45 and 46 since the upper gears 15a and 15b are engaged with the lower gears 14a and 14b while keeping the horizontal gap between the blades 45 and 46 at a predetermined value.

Figure 9:
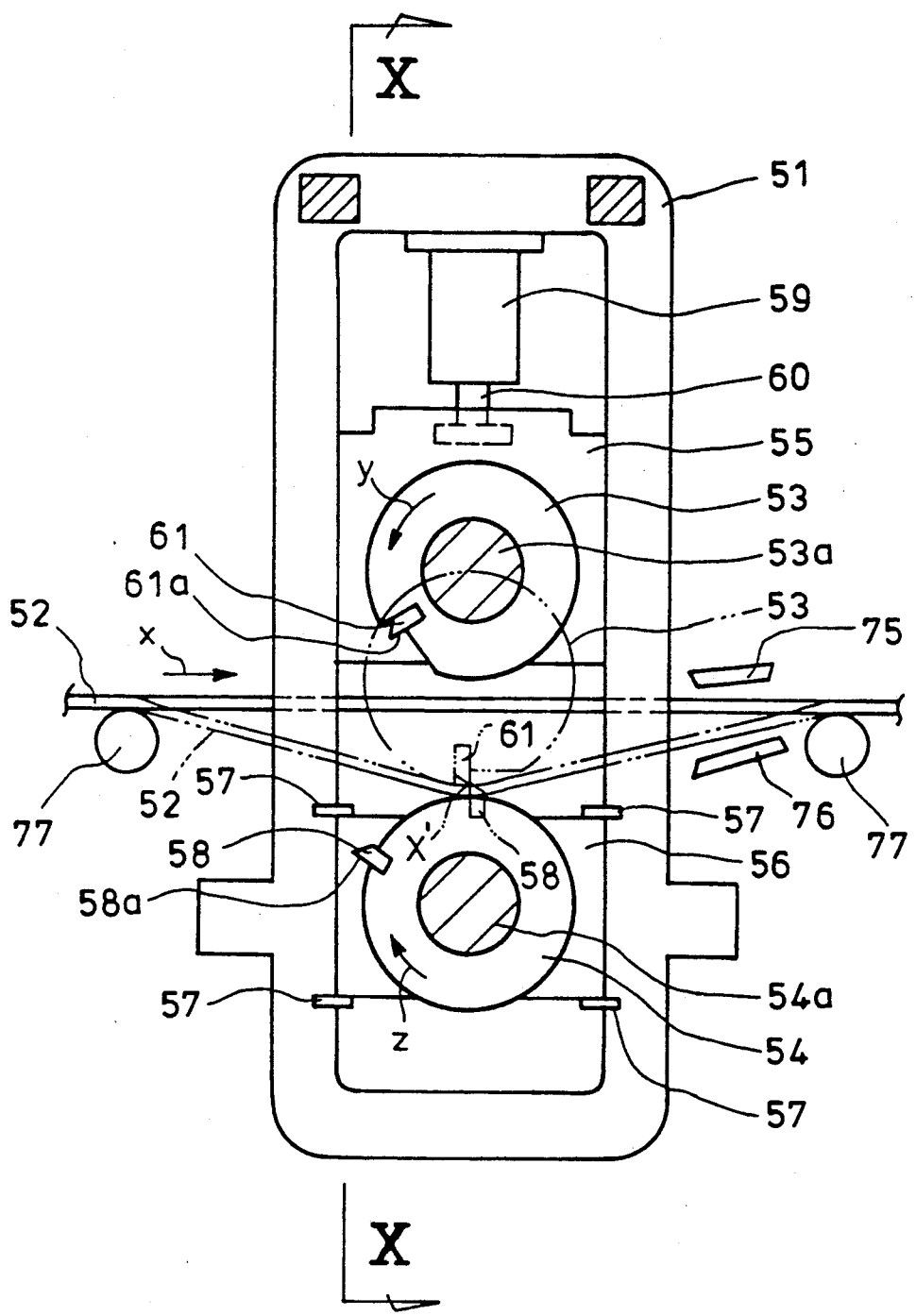
FIG. 9 is a side view showing a second embodiment of a shear according to the present invention.
Figure 10:
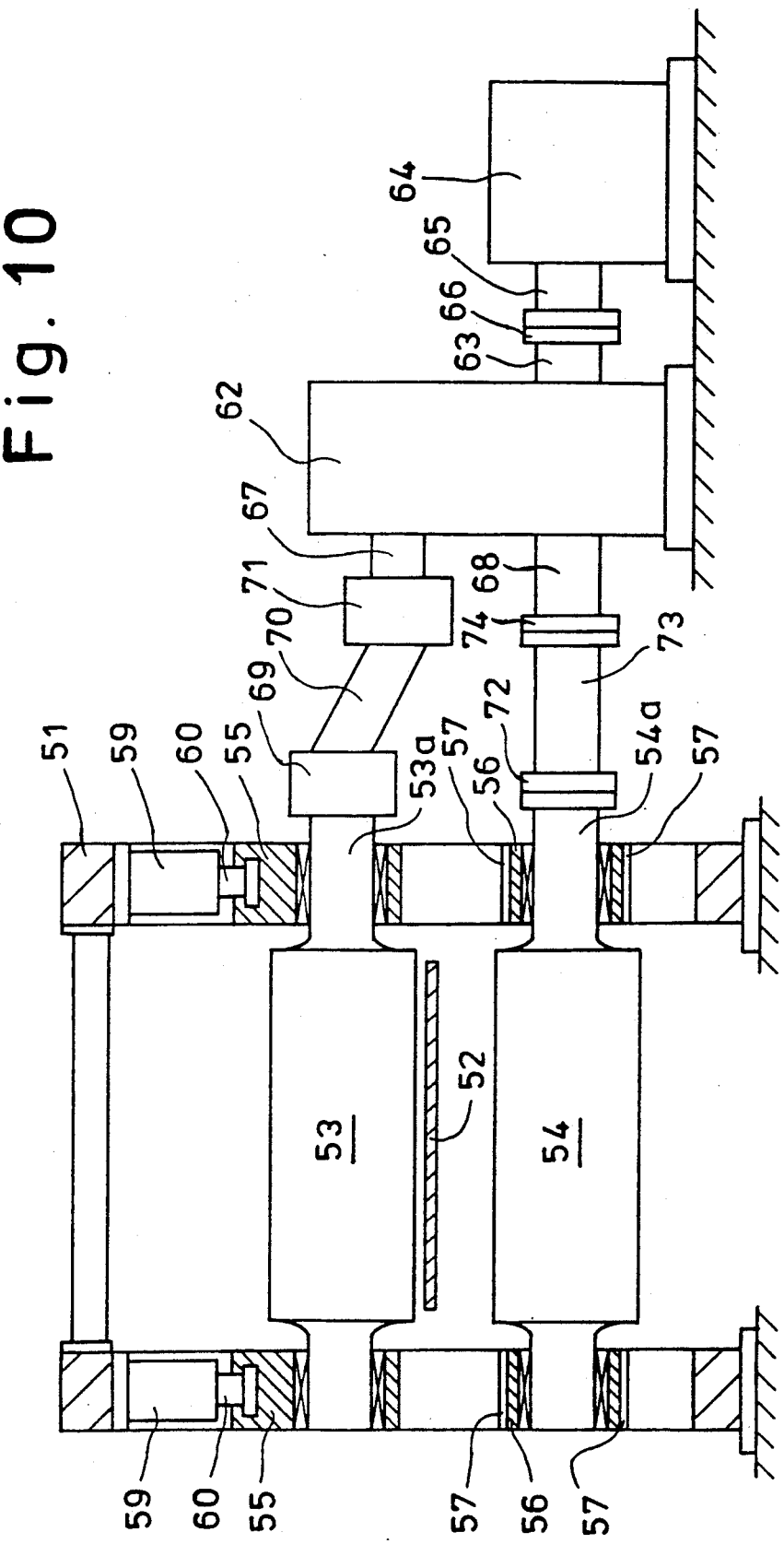
FIG. 10 is a view looking in the direction of the arrows X—X of FIG. 9.

FIGS. 9 and 10 show a second embodiment of the present invention in which a housing 51 with a window is installed in position for cutting of the strip 1. A pair of upper and lower drums 53 and 54 are rotatably fitted through shaft boxes 55 and 56 in the window of the housing 51.

Keeper plates 57 are between the shaft box 56 of the lower drum 54 and the window of the housing 51 to prevent the shaft box 56 from vertically moving. A blade 58 to cut off a strip 52 is fixed to the lower drum 54 such that a blade edge 58a protrudes from an outer periphery of the drum 54 and is on a plane including an axis of the drum 54.

A cylinder 59 with its piston rod 60 directed downward is mounted on a top of the window of the housing 51. The shaft box 55 of the upper drum 53 is connected to and is suspended from the piston rod 60 of the cylinder 59. As the piston rod 60 extends and retracts, the upper drum 53 vertically moves toward and away from the lower drum 54. A blade 61 to cut off the strip 52 is fixed to the upper drum 53 such that an edge 61a of the blade 61 is in alignment with an outer periphery of the upper drum 53 and is on a plane including an axis of the upper drum 53.

A reduction gearing 62 is disposed to drive the drums 53 and 54 and has an input shaft 63 which is connected through a coupling 66 to an output shaft 65 of an electric motor 64, so that output shafts 67 and 68 of the gearing 62 are rotated at the same velocity and in opposite directions by the motor 64.

The output shaft 67 of the gearing 62 is connected through a universal joint 71 to one end of a joint spindle 70 the other end of which is in turn connected through a universal joint 69 to a rotary shaft 53a of the upper drum 53. The output shaft 68 of the gearing 62 is connected through a coupling 74 to one end of a spindle 73 the other end of which is in turn connected through a coupling 72 to a rotary shaft 54a of the lower drum 54. Therefore, the driving force of the reduction gearing 62 is transmitted to the upper and lower drums 53 and 54 so that the drums 53 and 54 are rotated in opposite directions.

Reference numeral 75 and 76 represent members for guiding the strip 52; and 77, a deflector roll to support the strip 52.

Next, mode of operation will be described.

With the strip 52 moving in a direction x, the upper and lower drums 53 and 54 are vertically separated from each other as shown in FIG. 9 (solid line) and in FIG. 10.

When the strip 52 is to be cut off under such condition, the upper and lower drums 53 and 54 are rotated by the motor 64 through reduction gearing 62 in opposite directions. That is, the upper drum 53 is rotated counterclockwise (in the direction of arrow y) and the lower drum 54 is rotated clockwise (in the direction of arrow z) so that the strip 52 runs at a running velocity V when the blades 58 and 61 come to the center X' of the lap therebetween.

The piston rod 60 of the cylinder 59 is extended to lower the upper drum 53 toward the lower drum 54 to thereby push the strip 52 down while wrapping the strip 52 around the drum 53 as shown by the imaginary line in FIG. 9.

The timing and velocity of pushing the piston rod 60 of the cylinder 59 are set such that the blade edges 61a and 58a pass each other when the blade edge 61a comes to a lowermost portion of the upper drum 53 and the blade edge 58a comes to the uppermost portion of the lower drum 54 as shown by imaginary line in FIG. 9.

As described above, the upper drum 53 is lowered by the cylinder 59 to push down and apply tension to the strip 52. As a result, the upper drum 53 is rotated counterclockwise in the direction of arrow y together with the strip 52 wrapped around its lower peripheral surface. With the rotation of this upper drum 53, the blade 61 passes through the strip wrapped zone and comes to the position shown by the imaginary line in FIG. 9. Since the blade edge 61a is in alignment with the outer periphery of the upper drum 53 and does not protrude beyond the outer periphery of the upper drum 53, the blade edge 61a comes to the point where the strip 52 is to be cut off without changing the contact condition of the blade edge 61a with an upper surface of the strip 52, causing no scratches on the upper surface of the strip 52.

The blade edge 58a on the lower drum 54 with the strip 52 is brought to the point to cut off said strip 52 and the rotating velocity of the lower drum 54 at the contact point is made nearly equal to the running velocity of the strip 52. Consequently, the blade 58 comes to the point where the strip 52 is to be cut off without changing the position of the blade edge 58a relative to the lower surface of the strip 52, causing no scratches on the lower surface of the strip 52.

After the strip 52 is cut off as described above, the piston rod 60 of the cylinder 59 is retracted and the upper drum 53 is moved up. The rotation of upper and lower drums 53 and 54 is stopped and the upper and lower drums 53 and 54 are vertically separated from each other as shown by solid line in FIG. 9.

Figure 11:
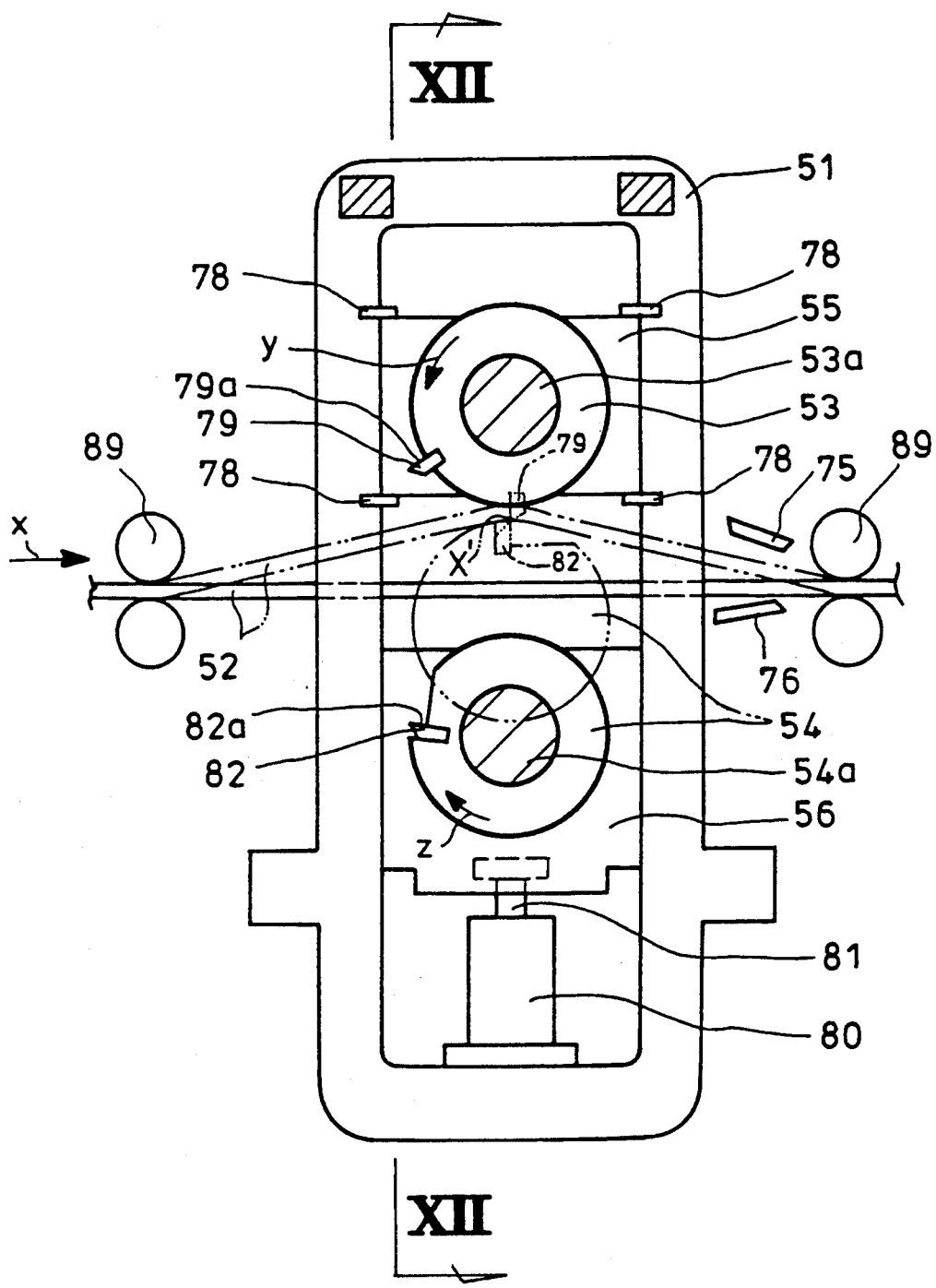
FIG. 11 is a side view showing a third embodiment of a shear according to the present invention.
Figure 12:
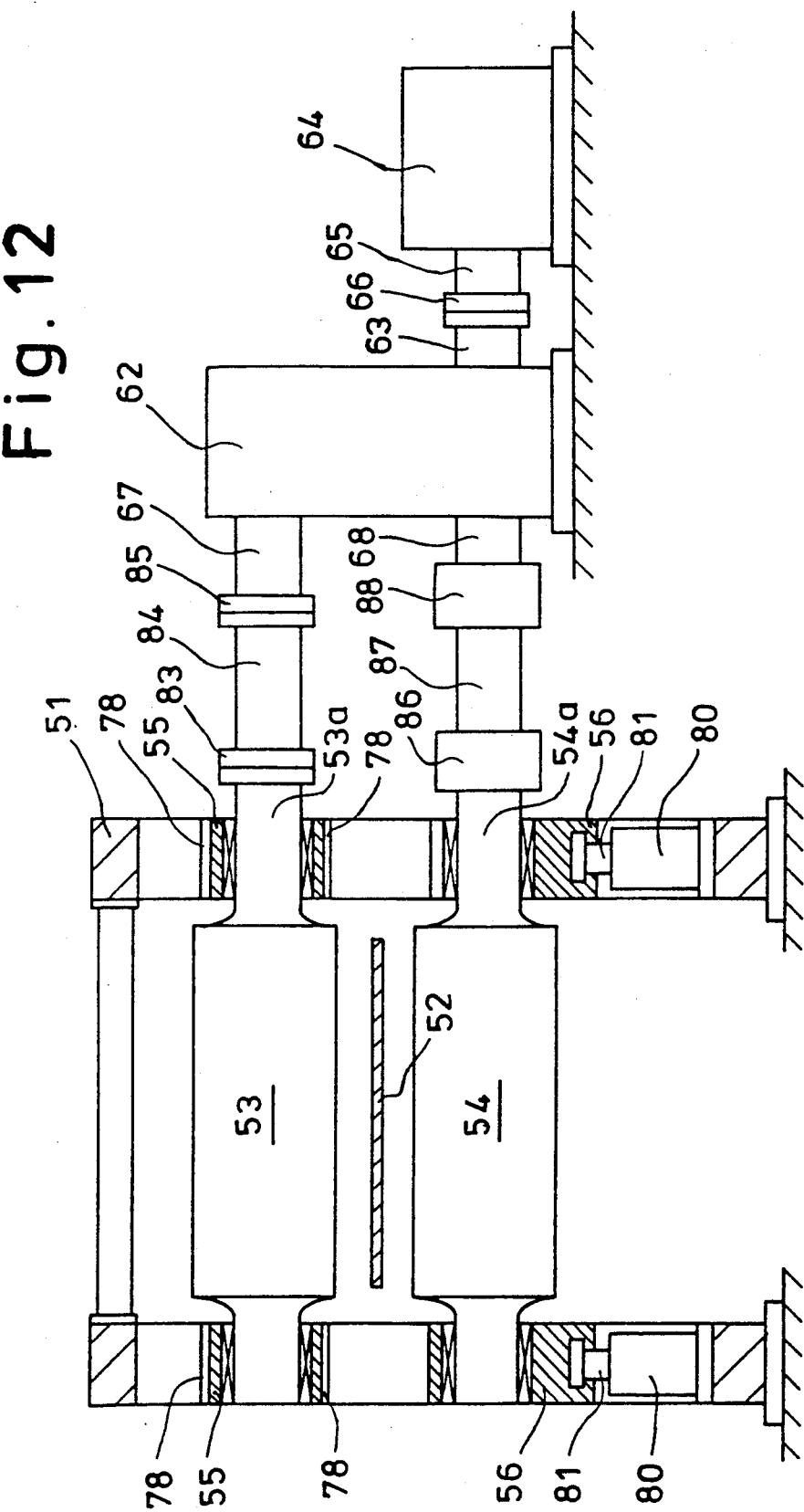
FIG. 12 is a view looking in the direction of the arrows XII—XII of FIG. 11.

FIGS. 11 and 12 show a third embodiment of the present invention in which the lower drum 54 is moved upward with respect to the upper drum 53 to wrap the strip 52 around the drum 54 to tension the strip 52 whereupon it is cut off. The same components as in FIGS. 9 and 10 are referred to by the same reference numerals.

Keeper plates 78 are between the shaft box 55 of upper drum 53 and the window of the housing 51 to prevent the shaft box 55 from vertically moving. A blade 79 for cutting the strip 52 is fixed to the upper drum 53 with its edge 79a protruding from an outer periphery of the drum 53 and being on a plane including an axis of the drum 53. A lower portion of the shaft box 56 of the lower drum 54 engaged in the window of the housing 51 is connected to a tip of a piston rod 81 of a cylinder 80, which is mounted on a base of the housing 53 with the piston rod 81 directed upward, so that the lower drum 54 is moved toward or away from the upper drum 53 as the piston rod 81 is extended or retracted. A blade 82 for cutting the strip 52 is fixed to the lower drum 54 with its edge 82a being aligned with an outer periphery of the drum 54 and on a plane including an axis of the drum 54.

A rotary shaft 53a of the upper drum 53 is connected through a coupling 83 to one end of a spindle 84 the other end of which is connected through a coupling 85 to an output shaft 67 of the reduction gearing 62. In like manner, a rotary shaft 54a of the lower drum 54 is connected through a universal joint 86 to one end of a spindle 87 the other end of which is connected through a universal joint 88 to an output shaft 68 of the reduction gearing 62. Thus, the upper and lower drums 53 and 54 are rotated in opposite directions by the electric motor 64. In FIG. 11, reference numeral 89 represents pinch rolls for feeding the strip 52.

In the above embodiment, when the strip 52 is to be cut off, the upper and lower drums 53 and 54 are rotated opposite or in the counterclockwise and clockwise directions (y and z), respectively, by the motor 64 so that the strip 52 may run at the velocity V at the center X' of the lap; the lower drum 54 is moved up toward the upper drum 53 by the cylinder 80 to wrap the strip 52 around the drum 54. Then, the strip 52 is clamped between the peripheral surfaces of the drums 53 and 54 in readiness for cutting. After the strip 52 is cut off, the lower drum 54 is separated from the upper drum 53 and is moved down by the cylinder 80 as shown by solid line in FIG. 11 for feed of the strip 52 between the drums 53 and 54. Similarly to the embodiment shown in FIG. 9 and 10, the strip 52 can be cut off with no scratches, thus increasing production yield.

In both the embodiments of FIGS. 9 and 10, and FIGS. 11 and 12 the strip 52 is guided on the rollers 77 through the housing in a linear or horizontal path as shown in FIGS. 9 and 11. In both embodiments, one drum 54 is rotatably fixed in the housing in a position where it is clear to one side of the strip's linear path of travel. The other drum 53 is vertically moveable to a position clear of the other side of the linear path as seen in FIGS. 9 and 11 but is movable to a position where it is at least partly below the linear path to deflect the strip into engagement with the fixed drum as shown in phantom lines. The advantage of this arrangement is that when the vertically movable roller is moved clear of the linear path, both drums and their blades are beyond the path so that a strip traveling therein cannot be scratched by the drums or blades.

Figure 13:
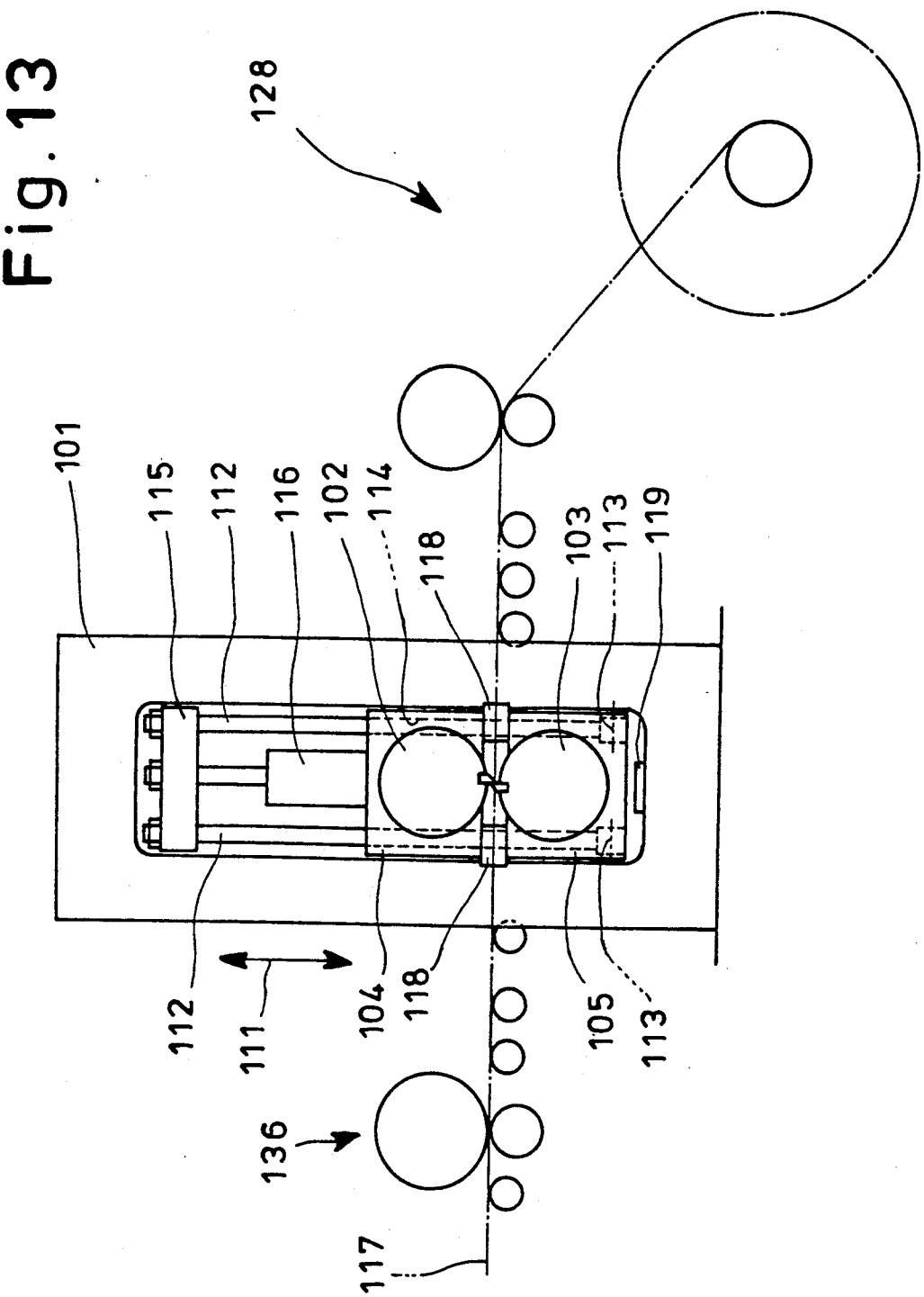
FIG. 13 is a side view showing a fourth embodiment of the shear according to the present invention.
Figure 14:
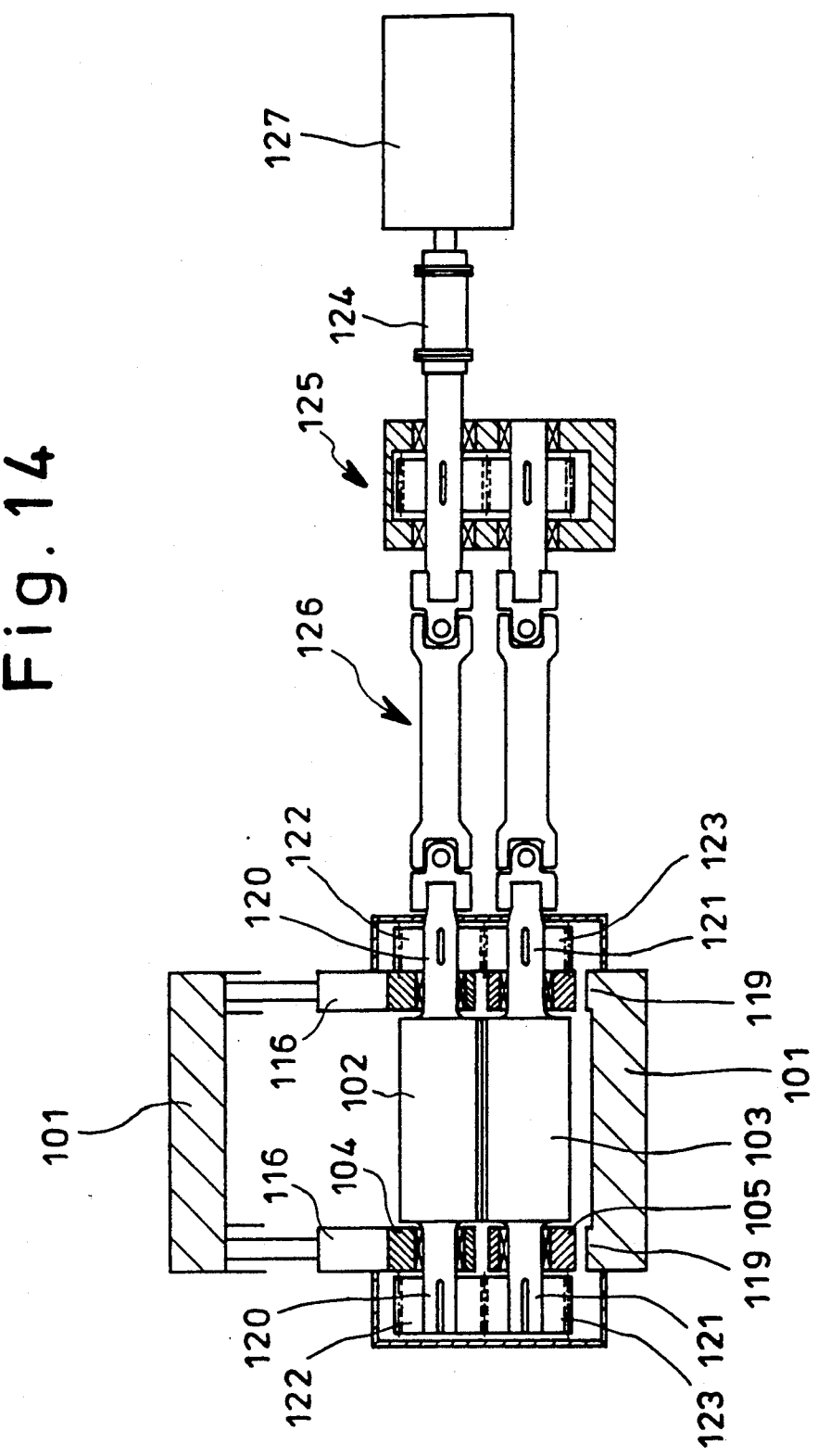
FIG. 14 is a lateral cross-sectional view of the shear shown in FIG. 13.
Figure 15:
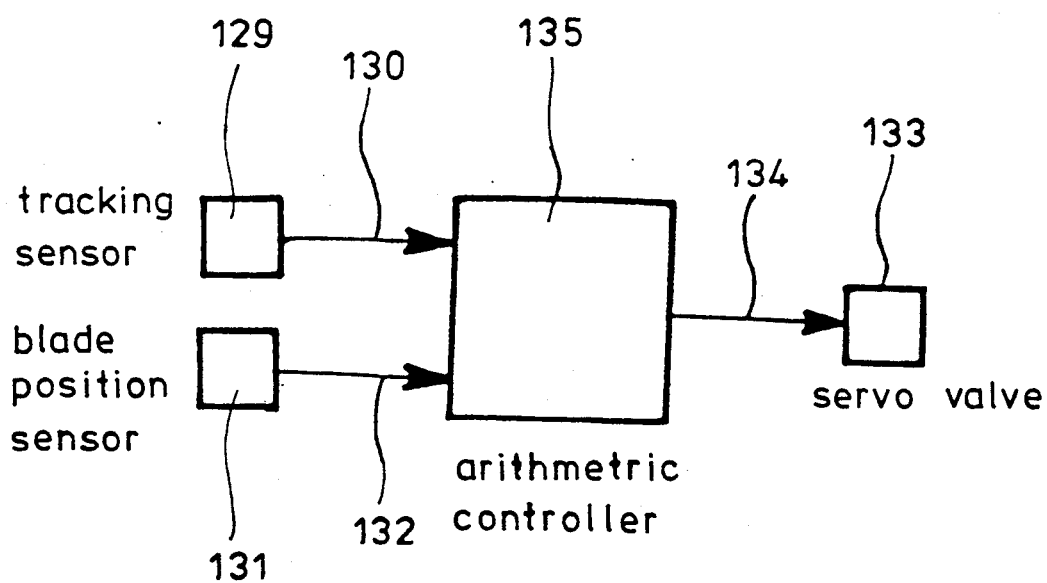
FIG. 15 is a control circuit diagram of the shear shown in FIG. 13.

FIGS. 13 to 15 show a fourth embodiment of this invention where upper and lower drum chocks 104 and 105 rotatably supporting upper and lower drums 102 and 103 are vertically movably within a housing 101.

As shown in FIG. 13, column means 112 extending in a vertical direction 111 is pivotally fixed at its lower ends to a lower drum chock 105 using pins 113 and slideably extends through holes 114 formed on an upper drum chock 104. A lift plate 115 vertically movable in the housing 101 is fixed to upper ends of the column means 112. A vertically extendable lift drive such as hydraulic cylinder 116 is provided between the upper drum chock 104 and the lift plate 115.

At the point where the strip 117 is cut inside the housing 101, a first stop 118 is provided as means for restricting the downward movement of the upper drum chock 114 and a second stop 119 is provided on a lower portion of the housing 101 for defining a lower limit of the lower drum chock 105.

As shown in FIG. 14, extensions 120 and 121 are provided on opposite ends of the upper and lower drums 102 and 103. Gears 122 and 123 are respectively fitted over the extensions 120 and 121 and are engaged to each other when the drums 102 and 103 come closer and are disengaged from each other when the drums 102 and 103 are separated.

The upper and lower drums 102 and 103 are connected to a motor 127 through a universal joint 126, an equal-velocity pinion stand 125 and a coupling 124.

Further, as shown in FIG. 15, an arithmetic controller 135 is provided to which inputted are a strip coiling signal from a tracking sensor 129 (for measuring coiling length of the strip on a down coiler 128 disposed downstream in the strip feed direction) and a blade position signal 132 from a blade position sensor 131 such as rotary encoder mounted on the drums 102 and 103. The arithmetic controller 135 serves to output a command signal 134 to a servo valve 133 for supplying hydraulic pressure oil to the lift drive 116.

In FIG. 13, reference numeral 136 represents pinch rolls mounted upstream in the strip feed direction.

Next, description is given on the mode of operation of this embodiment.

First, the lift drive 116 is contracted to separate the upper and lower drum chocks 104 and 105 from each other and cause the lower drum chock 105 to engage the stop 119. The strip 117 is passed between the upper and lower drum chocks 104 and 105 and is coiled by the down coiler 128 downstream in the feeding direction.

Since the upper and lower drum chocks 104 and 105 are separated from each other, any strip such as hot strip having warp on its tip end can be passed with no problems. In this case, the gears 122 and 123 engaged with the extensions 120 and 121 of the drums 102 and 103 are separated from each other.

When the strip moving at high velocity is to be cut off, the motor 127 is energized before the strip is to be cut in order to rotate the upper and lower drums 102 and 103 through the coupling 124, equal-velocity pinion stand 125 and the universal joint 126, with the rotating velocity of the drums 102 and 103 being equalized to the feed velocity of the strip.

With the down coiler 128 downstream in the strip feed direction of the housing 101, a tracking sensor 129 detects the coiled length of the strip. When this tracking sensor 129 outputs the strip coiling length signal 130, indicating that the strip of a predetermined length has been coiled up, to the arithmetic controller 135, the controller 135 determines in turn the timing by the blade position signal 132 from blade position sensor 131 such as rotary encoder mounted on the drums 102 and 103. Up to the time when the blades of the drums 102 and 103 pass through the cutting points at opposed positions and reach the next cutting point, command signal 134 is outputted to the servo valve 133, and hydraulic oil is supplied to the lift drive 116.

The lift drive 116 with supplied hydraulic oil is extended to lower the upper drum chock 104 until the chock 104 strikes against the stop 118 to stop, using the lift plate 115 (integral with the lower drum chock 105, which is prevented by the stop 119 from moving down) as foothold. When the upper drum chock 104 is blocked by the stop 118 from moving down, the lower drum chock 105 is moved up through the lift plate 115 and the column means 112, using the upper drum chock as foothold.

As the result, the gears 122 and 123 on the extensions 120 and 121 of the upper and lower drums 102 and 103 are engaged with each other, preventing any twisting of the drums 102 and 103. Next, the blades of the upper and the lower drums 102 and 103 are engaged in this condition, and the strip is cut off.

According to this embodiment with the above arrangement, it is possible to design the lift drive 116 in a single system and also to synchronize the upward and downward movements of the upper and drum chocks 104 and 105 through a single system of the lift drive.

Moreover, the upward and the downward movements of the upper and lower drum chocks 104 and 105 can be easily synchronized by a single system of the lift drive 116 and the movement can be speeded up. Accordingly, by rotating beforehand the upper and lower drums 102 and 103 to equalize their rotation with the feed velocity of the strip, the strip can be cut off at high velocity.

What is claimed is:

1. A shear comprising a housing, upper and lower drum chocks vertically movably mounted inside the housing for rotatably supporting upper and lower drums, column means extending upwardly from a connection with the lower drum chock and slideably passing through the upper drum chock to guide movement thereof, a lift plate fixed to the column means adjacent to a top of the column means so that the plate is movable in the housing together with the lower drum chock, an expansible and retractable lift drive between the upper drum chock and said lift plate, a first stop for stopping the upper drum chock at a strip cutting position upon expansion of said lift drive and a second stop for defining a lower limit position of the lower drum chock upon retraction of said lift drive.

2. A shear comprising first and second drums rotatably mounted in a housing, means for guiding strip material along a linear path through said housing, said first drum being rotatably fixed in said housing in a position clear of one side of said linear path, means for moving said second drum vertically between a first position clear of the other side of said linear path and a second position where at least a portion of said second drum extends into said linear path to deflect strip material traveling in said linear path into engagement with said first drum, a blade mounted on said vertically movable second drum with a blade edge being aligned with an outer periphery of said second drum and on a plane including an axis of the drum, a further blade mounted on said first drum with a blade edge protruding from an outer periphery of the drum and on a plane including an axis of the drum, said linear path being located in said housing that when said second drum is in its first position, a strip traveling in said linear path is entirely clear of both of said drums by distances such that said strip cannot be scratched by said drums or said blades.

* * * * *